United States Patent Office 3,421,733
Patented Jan. 14, 1969

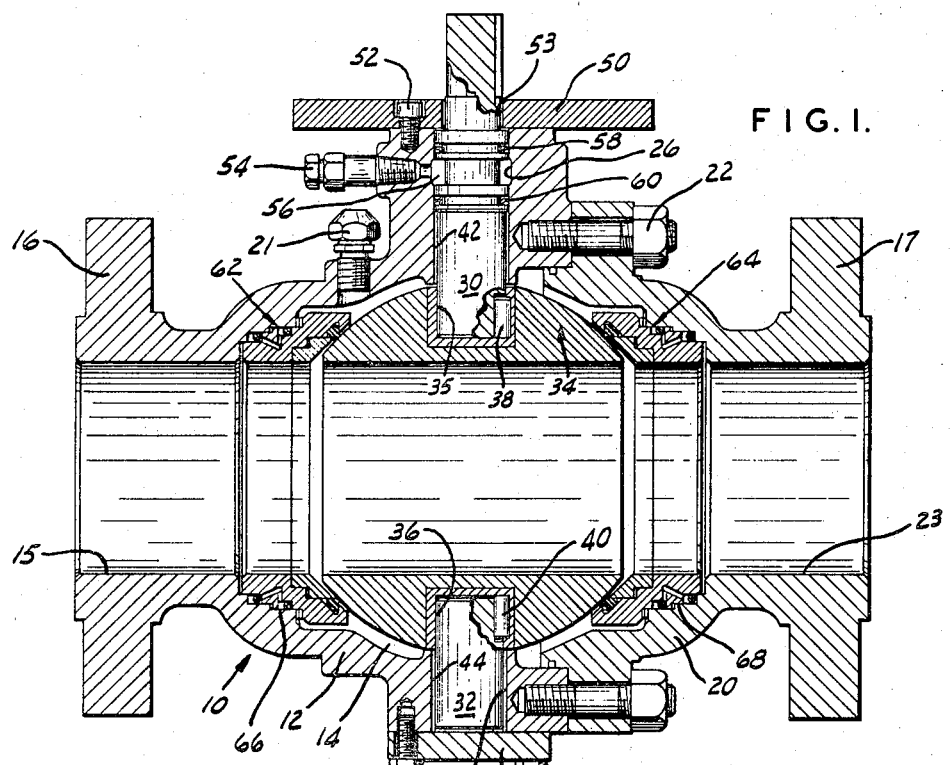

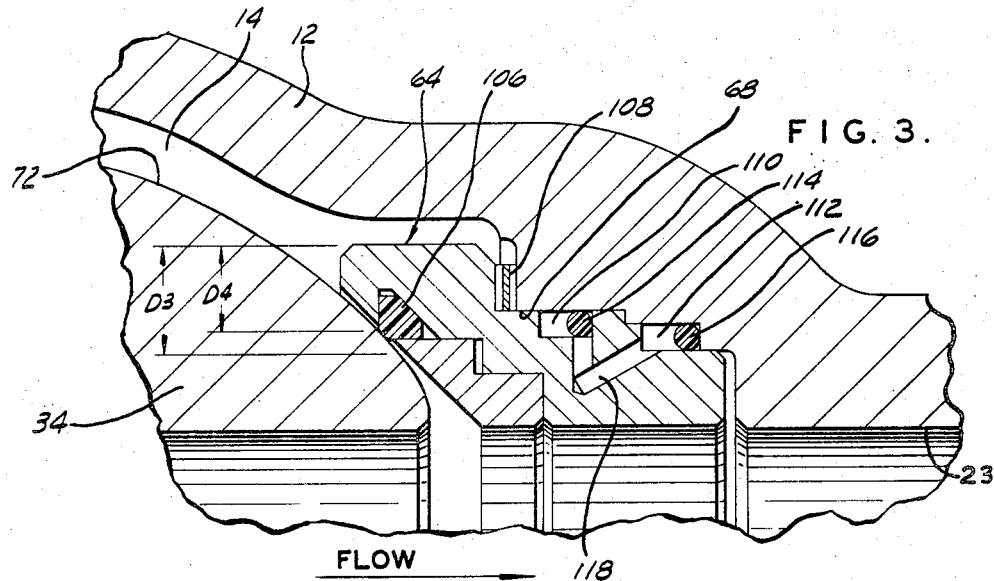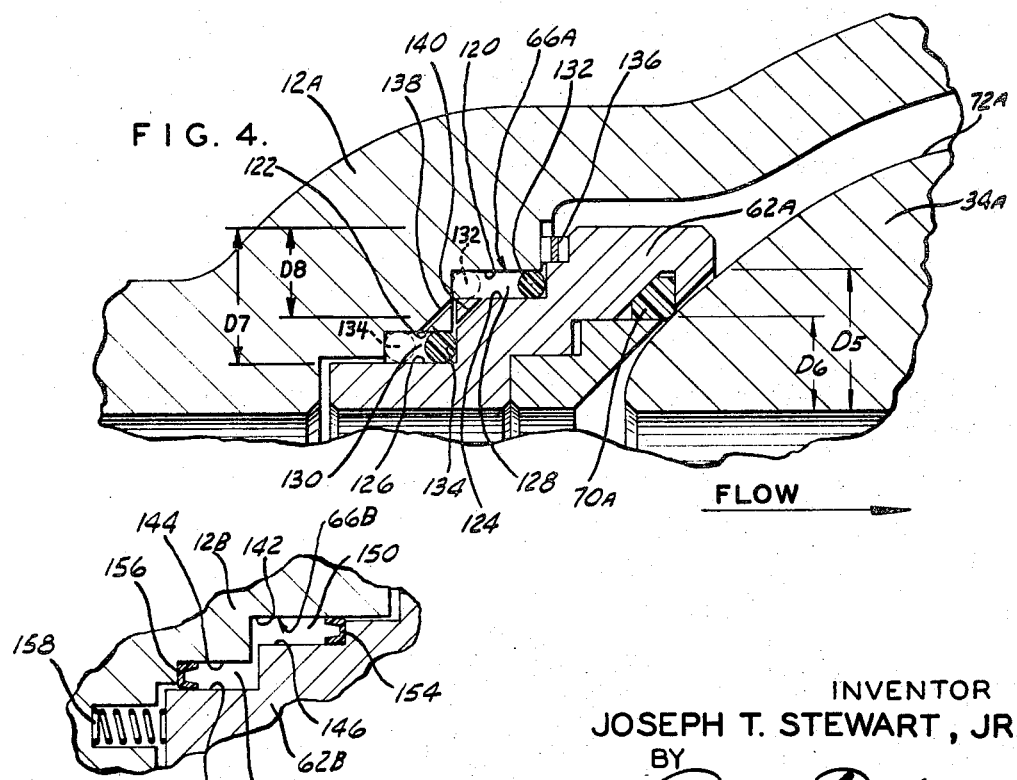

3,421,733
VALVE HAVING PRESSURE ACTUATED SEATS
Joseph T. Stewart, Jr., Houston, Tex., assignor to ACF Industries, Incorporated, New York, N.Y., a corporation of New Jersey
Filed Oct. 16, 1967, Ser. No. 675,415
U.S. Cl. 251—172                                    10 Claims
Int. Cl. F16k 25/00

ABSTRACT OF THE DISCLOSURE

A double-acting seat system for valves having valve members which are trunnioned or otherwise retained against the downstream movement by line pressure. Each of the seat assemblies for the valve includes structure which causes a greater area at the rear portion of the seat to be exposed to fluid pressure than at the face or front portion thereof, which results in pressure actuation of each of the seat assemblies in a direction toward the valve member.

Background of the invention

This application relates generally to valves for controlling the flow of fluids and more particularly to seat assembly constructions for valves which serve effectively as upstream or downstream sealing members depending upon the direction of fluid flow and which achieve positive fluid-tight seals between the valve member and valve body on both the upstream and downstream sides of the valve regardless of the direction of fluid flow.

In most valves having trunnioned rotary plug members or having gate members which are prevented from moving downstream under line pressure, sealing is accomplished only by the seat member located on the upstream side of the valve member. The downstream sealing member ordinarily will be forced downstream by the pressurized fluid within the valve and will not establish a fluid-tight seal with the valve member. It is readily apparent under this arrangement that when the upstream sealing member becomes damaged or becomes worn to the point that sealing is impossible, the valve will leak because the downstream sealing member will not provide sealing ability under these conditions. The downstream sealing member of such valves will provide sealing ability only if the flow of line fluid is reversed within the valve, thereby reversing the function of the downstream sealing member and causing it to function as an upstream sealing member.

Accordingly, it is a primary object of this invention to provide novel valve having seat assembly structures which will effectively provide simultaneous upstream and downstream sealing with the valve member at all times.

It is a further object of this invention to provide a novel seat assembly structure for valves which effect independent seals with the valve member, thereby allowing positive sealing to be maintained in the event one of the seat assemblies becomes damaged or worn to the point that positive sealing is impossible.

Among the several objects of this invention is contemplated the provision of novel seat assembly structures for valves which are inexpensive in nature and reliable in use.

Briefly the invention relates to a valve having a valve body and a movable valve member which is disposed within the body and which is supported by trunnions or the like to prevent downstream movement of the valve member by pressurized fluids controlled by the valve. The valve body is provided with a pair of opposed seat recesses which are disposed about the upstream and downstream flow passages of the valve and which receive seat assemblies movably received within seat recesses formed about the flow passages of the valve. The seat assemblies establish a perimeter of sealing contact with the valve member, generally referred to as a face seal, which perimeter may be circular in the event the valve is a spherical plug valve or a gate valve. The sealing perimeter, of course, may have any other desired configuration without departing from the spirit and scope of my invention. Each of the seat assemblies of a valve constructed in accordance with my invention interfits within the valve body to define a pair of annular back seal chambers. One of the back seal chambers is disposed radially outwardly of the sealing perimeter established by the face seal, while the other of the back seal chambers is disposed radially inwardly of the face sealing perimeter. Either the seat assembly or the valve body or both the seat assembly and valve body or the back seals may include structure to provide for bypassing fluid pressure past the inner back sealing member of the upstream seat and for bypassing fluid pressure past the outer back sealing member on the downstream seat. This feature allows fluid pressure to act against the rear portion of the upstream seat upon an area which is greater than the area at the front or face portion of the valve seat which is defined by the face sealing perimeter, thereby developing a force differential which causes the upstream seat to be pressure actuated or moved downstream into sealing engagement with the valve member. Likewise, fluid pressure from the valve body bypasses the outer back sealing member and applies a force to a greater area at the rear portion of the downstream seat than at the face portion thereof, thereby pressure actuating the downstream seat toward the valve member to establish a fluid-tight seal. In the event either of the seat assemblies becomes damaged or worn to the point that it loses its sealing contact with the valve member, the other seat assembly will maintain a positive fluid-tight seal and prevent leakage.

Other and further objects of this invention will become obvious upon an understanding of the illustrative embodiments about to be described or will be indicated in the appended claims and various advantages not referred to herein will occur to one skilled in the art upon employment of the invention in practice.

Other objects of the present invention will become apparent to one having ordinary skill in the art upon an understanding of the following description taken in conjunction with the accompanying drawings in which:

FIGURE 1 is an elevational view in section illustrating a spherical plug valve constructed in accordance with the spirit and scope of the present invention.

FIGURES 2 and 3 are fragmentary sectional views of the valve of FIGURE 1 illustrating the seat assemblies of the valve of FIGURE 1 and operation thereof in greater detail.

FIGURES 4 and 5 are fragmentary sectional views of seat assemblies illustrating modified embodiments of this invention.

Referring now to the drawings for a more complete understanding of this invention, a valve which may be an end entry sphercial plug valve as illustrated at 10 in FIGURE 1 has a valve body portion 12 thereof defining a valve chamber 14. The valve body portion 12 of the valve 10 is formed with an inlet or outlet flow passage 15 in fluid communication with the valve chamber 14. The valve body may be provided with a flange structure shown at 16 in FIGURE 1, or it may be provided with a weld end construction for either bolted or welded connection of the valve 10 to a pipeline or other conduit structure. Other conventional methods of connection between the valve 10 and a pipeline such as threaded connection, for example, may be employed without departing from the spirit or scope of this invention. An end closure portion 20 of the valve 10 is retained in sealed assembly with the valve body portion 12 by a series of bolts or threaded studs 22 and defines a closure for the valve chamber. The end closure member 20 is formed with an inlet or outlet flow passage 23 which is disposed in axial alignment with the flow passage 15. The end closure member 20 may be provided with a flanged structure 17 for bolted connection thereof to a pipeline or other suitable conventional connection structure may be employed within the spirit or scope of this invention. The valve body 12 may be provided with a pressure relief fitting 21 for bleeding body pressure to the atmosphere if desired.

The valve body 12 is formed with upper and lower aligned apertures 26 and 28, respectively, which receive upper and lower trunnion members 30 and 32 respectively therein. A valve member 34 which may be a spherical plug is provided with upper and lower trunnion apertures 35 and 36, respectively, which receive the upper and lower trunnions 30 and 32 to maintain alignment of the spherical plug within the valve body. Upper and lower key members 38 and 40 are retained within interrelated slot structures formed within the plug members and trunnion members to provide nonrotatable connection between the trunnion and the spherical plug. If desired, the key structure for the lower trunnion 32 may be eliminated and the ball 34 may be disposed in rotatable relation to the lower trunnion. It is required only that there be a nonrotatable connection between the operating trunnion or stem 30 and the ball 34 for purpose of valve operation. Bearing sleeve members 42 and 44 are interposed between the trunnion members and the respective cylindrical trunnion bores in the valve body. A cover plate 46 which provides a closure and support plate for the trunnion aperture 28 is fixed to the valve body 12 by a series of bolts 48. An operator adapter plate 50 is connected by a series of cap screws 52 to the upper extremity of the valve body about the upper trunnion bore 26. The upper trunnion or stem 30 extends through an aperture 53 formed in the adapter plate. Any of a number of commercially available power or manually actuated valve operator devices may be fixed to the adapter plate 50 in any desirable manner to provide mechanical means for imparting rotation to the upper trunnion member 30, thereby to impart rotation to the spherical plug member between the open and closed positions thereof.

For establishing a seal between the upper trunnion or stem 30 and the valve body 12, a stem packing adapter 54 is connected to the valve body 12 by threading or the like. The packing adapter is utilized to force semisolid packing material into an annular packing chamber 56 defined about the valve stem 30. A pair of sealing members 58 and 60 are disposed on opposite sides of the packing chamber 56 within annular grooves formed in the stem 30 and serve to prevent escape of the packing material from the packing chamber through the stem aperture 26.

To establish a seal between the rotatable spherical plug member 34 and the valve body, a pair of annular seat assemblies 62 and 64 are retained respectively within annular seat pockets 66 and 68 formed in the flow passages 15 and 23 as illustrated in detail in FIGURES 2 and 3. The seat assemblies may include a sealing element 70 of any desired configuration or material which is disposed for sealing engagement with the spherical working surface 72 of the ball member 34. The seat assembly is biased into initial sealing engagement with the working surface 72 by a spring member 65 which may be a wave spring as illustrated in FIGURE 2. The sealing engagement between the sealing element 70 and the working surface 72 of the spherical plug 34 defines a sealing perimeter which will be circular in case the valve is of the spherical plug type as illustrated in the drawings, but it is not intended that the scope of this application be limited to valves defining circular sealing perimeters. This invention is equally applicable to valves defining noncircular perimeters between the seat assemblies and the valve member such as would occur when the invention is employed in cylindrical plug valves, for example.

With reference particularly to FIGURE 2, the seat pocket 66 on both the upstream and downstream sides of the ball member 34 include annular surfaces 74 and 76 which are concentrically formed and have different diameters. An annular shoulder 78 is defined by a planar surface within the seat pocket 66 and is disposed in substantially normal relationship with the cylindrical surface 76. The seat assembly 62 is provided with a pair of concentrically related annular surfaces 80 and 82 which also define different diameters. The annular surfaces 80 and 82 are separated by an annular flange 84 which defines annular abutment surfaces 86 and 88 disposed in substantially normal relationship with the cylindrical surfaces 80 and 82 respectively. An annular abutment surface 90 is formed on the seat assembly 62 and is also disposed in substantially normal relationship with the cylindrical surface 80.

The annular or cylindrical surfaces 80 and 82 of the seat assembly 62 cooperate with the annular surfaces 74 and 76 of the seat pocket 66 to define a pair of radially and axially spaced annular chambers 92 and 94. Back sealing members 96 and 98 are disposed within the annular chambers 94 and 92 respectively and serve to establish fluid-tight seals between the body 12 and the seat assembly 62. As illustrated in FIGURES 1 through 4, the back sealing members may be in the form of resilient O-rings, but it is not intended to limit this invention to the use of O-ring members. It is clearly apparent that movable back sealing members of other desired shapes may be employed without altering the spirit or scope of this invention. The back sealing members 96 and 98 are slightly greater in cross-sectional dimension of the respective annular chambers 94 and 92, whereby the back sealing members are maintained under slight radial compression within the annular chambers to define fluid-tight seals between the seat assembly and the valve body. For example, the back sealing member 96 will establish a fluid-tight seal with the cylindrical surface 74 defining a portion of the seat pocket 66 and with the generally cylindrical surface 80 formed on the seat assembly 62.

The annular chambers 92 and 94 are of considerably longer axial length than the diameter of the back sealing members 98 and 96 respectively. This feature allows the back sealing members to shift axially under the influence of fluid pressure as will be discussed hereinbelow.

The seat assembly 62 is provided with a bypass passage 100 which is defined by intersecting drill passages and which serves to bypass fluid pressure from one of the annular chambers to the other, depending upon the direction of fluid flow.

The other seat assembly 64, illustrated in FIGURE 3, is substantially identical to the seat assembly 62 and includes an annular resilient sealing member 106 which engages the sealing or working surface 72 of the plug member 34 to establish a sealing perimeter with the plug member. A spring member 108 which may be a wave spring as shown in FIGURE 3 is interposed between the seat assembly 64 and a shoulder defined on the valve body 12 serves to bias the seat assembly 64 into sealing engagement with the plug member 34. The seat pocket 68 includes annular surfaces which cooperate with annular surfaces on the seat assembly 64 to define a pair of radially and axially spaced annular chambers 110 and 112 which receive annular back sealing members 114 and 116 in the same manner as discussed above in regard to the annular chambers 92 and 94 in their respective sealing members. A bypass passage 118 is formed in the seat assembly structure 64 and establishes fluid communication between the spaced annular chambers 110 and 112 to bypass fluid pressure between the annular chambers responsive to fluid pressure as will be discussed hereinbelow.

As illustrated in FIGURE 4, a modified embodiment of my invention includes a valve body 12A of generally the same construction and design as illustrated in FIGURE 1. The valve body 12A is provided with opposed seat pockets, one of which is shown at 66A, defining radially spaced annular surfaces 120 and 122. A seat assembly 62A is disposed within the seat recess 66A and is provideed with annular radially spaced surfaces 124 and 126 which cooperate with the surfaces 120 and 122 respectively to define a pair of annular back seal chambers 128 and 130. Back sealing members 132 and 134, which may be of the O-ring type, are disposed within the annular chambers 128 and 130 respectively and serve to establish a fluid-tight seal between the seat assembly 62A and the valve body 12A. A spring member 136 is interposed between the seat assembly 62A and an annular shoulder defined on the valve body 12A and serves to bias the seat assembly into sealing engagement with the spherical working surface 72A of the plug member 34A. A face sealing element 70A carried by the seat assembly 62A establishes a sealing perimeter with the working surface 72A of the plug member. Pressure bypass passages 138 and 140 are formed respectively in the valve body 12A and in the seat assembly structure 62A and function in response to fluid pressure to bypass fluid pressure between the annular chambers 130 and 128. The bypass passages may be drilled holes as shown in FIGURE 4 or may be slots cut in the shoulders of the seat pocket and seat assembly walls, if desired. Operation of the seat assembly structure set forth in FIGURE 4 will be discussed hereinbelow.

The fragmentary sectional view of FIGURE 5 illustrates a modified embodiment of my invention wherein a valve body 12B similar to that illustrated in FIGURE 1 is provided with seat recess structure 66B defining a pair of annular surfaces 142 and 144 concentrically disposed within the valve body essentially as discussed above in regard to the surfaces 74 and 76 in FIGURE 2. A seat assembly structure 62B is positioned within the seat recess 66B and includes a pair of annular surfaces 146 and 148 which cooperate respectively with surfaces 142 and 144 to define annular chambers 150 and 152. The annular chambers 150 and 152 are concentrically arranged within the valve body and define outer and inner sealing perimeters which are disposed radially outwardly and radially inwardly respectively of a sealing perimeter established between a face sealing member and the working surface of the valve member in the same manner as discussed above in regard to FIGURES 2 and 4. A pair of annular sealing members 154 and 156 are disposed respectively in annular chambers 150 and 152 and serve to establish a fluid-tight seal between the seat assembly 62B and the valve body 12B. The sealing members 154 and 156 are generally C-shaped sealing members, referred to as U cups or C cups and are composed of a radially oriented web having upper and lower flanges connected thereto. The flanges of the sealing members 152 and 154 are slightly compressed between the cylindrical surfaces defining the annular chambers to establish light engagement for the development of an initial seal between the cylindrical surfaces. The sealing members 154 and 156 serve essentially as check valves to allow the flow of fluid in one direction while preventing the flow of fluid in the opposite direction. It should be noted in contrast to the O-ring type movable back sealing members of FIGURES 1–4 that the back sealing members of FIGURE 5 allow the bypass of pressure without axial movement. A spring member which may be a coil spring as shown at 158 is retained by the valve body structure and serves to bias the seat assembly structure 62B into initial light sealing engagement with the working surface of the valve member. Operation of the seat assembly structure set forth in FIGURE 5 will be discussed hereinbelow.

*Operation*

With regard to FIGURES 2 and 3, assuming hypothetically that the flow of pressurized fluid is as shown by the arrow in each of these figures, and that the valve member 34 is disposed in its closed position, i.e., rotated 90° from the position shown in FIGURES 1 and 2, the seat assembly 62 will be constituted as an upstream seat and the seat assembly 64 as shown in FIGURE 3 will function effectively as a downstream seat. Fluid pressure from the flow passage 15 will act upon the inner back sealing member 98 forcing the inner back sealing member downstream into abutment with the annular shoulder 88. Under this condition the bypass passage 100 is uncovered, thereby breaking the seal between the sealing member 98 and the annular surface 82 and allowing pressurized fluid to flow from the inner annular chamber 92 to the outer annular chamber 94. The bypassed pressure within the outer annular chamber 94 will bear upon the back sealing member 96 forcing the same into abutment with the annular surface 90 of the valve seat. The fluid pressure from the flow passage of the valve therefore will act upon a rear area D1 of the seat assembly, which is established by the cylindrical surface 74 of the valve seat recess 66. Simultaneously, line pressure from the fluid passage 15 of the valve will act upon a front portion of the seat assembly as defined by the area D2 which is established by the perimeter of sealing engagement between the sealing member 70 and the working surface 72 of the spherical plug 34. The difference in areas between the area D2 of the face portion of the seat assembly and the area D1 at the rear portion of the seat assembly defines an area differential which is larger at the rear portion of the seat assembly than at the face portion thereof. Fluid pressure from the line acting upon this area differential will result in a force differential which biases the seat assembly 62 in a direction toward the valve member 34. This feature is known as pressure actuation of the seat assembly.

With reference now to FIGURE 3, assuming that the valve member 34 is rotated 90° to its closed position, as discussed in the above hypothetical situation, the pressure within the downstream line 23 ordinarily will be substantially lower than that of the upstream line. Fluid pressure within the valve chamber 14 will bear upon the outer annular back sealing member 114 forcing the same downstream into engagement with the shoulder of the chamber 110 thereby breaking sealing engagement between the sealing member 114 and the cylindrical surface of the seat assembly and establishing fluid communication between the annular chambers 110 and 112 by way of the bypass passage 118. The fluid which is bypassed will impinge upon the inner back seal member 116 forcing the same downstream into engagement with an annular shoulder defined by the seat pocket wall as illustrated in FIGURE 3. This feature allows the fluid pressure from the valve body to act upon an area at the rear portion of the seat defined by the area D3 while body pressure acting upon the front surface of the seat assembly will act through a smaller area D4 defined by the sealing perimeter established between the sealing member 106 and the working surface 72 of the spherical plug 34. This feature causes the seat assembly 64 to have an area differential acted upon by line pressure. This area differential is established by the difference in areas D3 and D4 providing a resultant area which is greater at the rear portion of the seat assembly and thereby resulting in a force differential tending to bias the seat assembly 64 in a direction toward the spherical plug member 34.

It is therefore understood that both the upstream seat assembly 62 shown in FIGURE 2 and the downstream seat assembly 64 shown in FIGURE 3 will be pressure actuated into fluid-tight sealing engagement with the working surface of the spherical plug 34 for the purpose of achieving greater sealing ability than is ordinarily found in trunnioned valves. In the event either the upstream or downstream seat assemblies become damaged or worn to the extent that the sealing ability thereof is lost or impaired, the other of the seat assemblies will continue to maintain a fluid-tight seal to prevent leakage of the valve during operation thereof.

In the event that the direction of fluid flow is reversed the function of the seat assemblies will reverse thereby causing the seat assembly 64 to function effectively as an upstream seat and causing the seat assembly 62 to operate as a downstream seat. Both of the seats will be pressure actuated into fluid-tight sealing engagement with the working surface 72 of the spherical plug member 34 in the manner described hereinabove.

With regard to FIGURE 4, a modified embodiment of my invention utilizes a different arrangement of fluid communication passages as compared with the structures illustrated in FIGURES 2 and 3, but achieves a similar function. Assuming that the seat assembly illustrated in FIGURE 4 is to function as an upstream seat and the flow of fluid is in the direction illustrated by the arrow, fluid acting under line pressure will bear upon the inner back sealing member 134 forcing the same downstream into engagement with an annular shoulder of the seat assembly 62A thereby uncovering the fluid passage 138 and bypassing fluid from the annular chamber 130 into the annular chamber 128. The bypassed fluid in turn will bear upon the O-ring back sealing member 132 forcing the same downstream into engagement with an annular shoulder on the seat assembly 62A. This feature allows fluid pressure from the flow passage of the valve to act upon a rear area of the seat assembly 62A which is established by the cylindrical surface 120 and defined by area D5. At the same time fluid pressure from the flow passage acts upon an area D6 at the front portion of the seat thereby establishing an area differential defined by the difference between areas D5 and D6 and resulting in a force differential which is greater at the rear portion of the seat assembly than at the face portion thereof. This force differential causes the seat assembly to be pressure actuated toward the valve member 34A.

In the event the seat assembly 62A is to function as a downstream seat such as would occur upon reversal of the flow of fluid, the fluid pressure from the valve chamber will act upon the sealing member 132 forcing the same downstream to the position illustrated in broken lines, thereby uncovering the bypass passage 140 and bypassing fluid into the annular chamber 130. The bypassed fluid acting upon the O-ring type sealing member 134 will force the same downstream to the broken line position thereof. This feature allows fluid pressure from the valve body to act upon an area at the rear portion of the seat assembly defined by the cylindrical surface 126 which is referred to as area D7. Simultaneously, fluid pressure from the valve body acts upon an area D8 defined by the perimeter of sealing contact between the annular sealing member 70A and the working surface 72A of the plug member 34A. This feature results in an area differential in communication with fluid pressure from the valve body which is greater at the rear portion of the seat assembly than at the face portion thereof as defined by the difference between areas D7 and D8, thereby resulting in a force differential which is greater at the rear portion of the seat and which biases the seat assembly toward the plug member 34A.

It is seen therefore that the valve construction illustrated in FIGURE 4 accomplishes pressure actuation of both the upstream and downstream seat assemblies in the closed position of the valve in essentially the same manner as discussed above in regard to FIGURES 1, 2 and 3.

The modified embodiment of my invention shown in FIGURE 5 achieves pressure actuation of the upstream and downstream seat assemblies essentially in the same manner discussed above without the necessity of providing movable back sealing members and bypass passages. Assuming hypothetically that the seat assembly 62B is functioning as an upstream seat, fluid pressure from the flow passage of the valve will bear upon the inner sealing member 156 causing the annular flanges thereof to collapse and allow the bypass of fluid pressure into the annular chambers 150 and 152. The bypassed fluid within the chamber 150 will bear upon the outer sealing member 154 causing the flanges thereof to expand into tighter sealing engagement with the cylindrical surfaces 142 and 146, thereby resulting in a tighter seal and containing the fluid pressure. The fluid pressure from the flow passage therefore is communicated outwardly of the inner sealing member and acts upon an area of the rear portion of the seat assembly 62B defined by the cylindrical surface 142, thereby establishing an area in communication with fluid pressure which is greater at the rear of the seat assembly than the area at the face portion thereof and resulting in pressure actuation of the seat assembly 62B downstream into sealing engagement with a valve member.

Conversely, in the event the seat assembly 62B is functioning as a downstream seat, the flanges of the outer annular sealing member 154 will be caused to collapse by the body pressure and will allow the bypass of pressurized fluid from the valve chamber into the annular chambers 150 and 152. The bypassed fluid will bear upon the sealing member 156 expanding the flanges thereof into tighter sealing engagement with the cylindrical surfaces 144 and 148, thereby containing the fluid pressure. Fluid pressure therefore is communicated from the valve body to the rear portion of the seat assembly and acts upon an area defined by the cylindrical surface 148, which is greater than the area at the face portion thereof in communication with body pressure. This results in a force differential which is greater at the rear of the seat than at the face thereof causing the downstream seat to be biased toward the valve member to achieve a fluid-tight seal. It is therefore seen that the construction illustrated in FIGURE 5 achieves the same function as discussed above in regard to the constructions of FIGURES 3 and 4 without necessitating axial movement of the back sealing members 154 and 156. It is clearly apparent therefore that the back seal construction illustrated in FIGURE 5 will effectively achieve pressure actuation of both the upstream and downstream seat assemblies to achieve a double seal with the valve member at all times. In the event either the upstream or downstream face sealing members carried by the seat assemblies become worn or damaged to such an extent that sealing is prevented, the other of the seat assemblies will effectively maintain a fluid-tight seal to prevent valve leakage. It is also clearly apparent that reversal of the direction of fluid flow will not have an adverse effect on the seat assembly structure of FIGURE 5, but will merely result in reversal of the function of the seat assemblies from upstream sealing to downstream sealing without altering the independent sealing function thereof.

It is evident from the foregoing that I have provided a unique pressure actuated seat structure for valves which utilizes line pressure and body pressure to achieve pressure actuation of both the upstream and downstream seat assemblies of the valve into fluid-tight sealing engagement with the valve member. My invention as set forth above is applicable to a number of valve types including gate valves, spherical plug valves, cylindrical plug valves and the like and therefore it is not intended to limit my invention to any specific construction illustrated or described in this application. Valve seat assemblies constructed in accordance with the spirit and scope of my invention function effectively to achieve a fluid-tight seal with the valve member which is directly responsive to the amount of fluid pressure controlled by the valve. In other words, the higher the pressure the tighter the seal. Each of the seat assemblies of valves constructed in accordance with my invention effectively achieves an independent seal with the valve member thereby allowing one of the seals to function properly in the event the other is prevented from sealing due to excessive wear or damage. The objects of my invention may be effectively accomplished with nonmovable back sealing members as illustrated in FIGURE 5. My invention as illustrated by the various embodiments in this application is quite simple and valves constructed in accordance with my invention are inexpensive in nature and reliable in use. It is evident therefore that my invention is one well adapted to attain all of the objects hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the appended claims.

As many possible embodiments may be made of my invention without departing from the spirit or scope thereof, it is to be understood that all matters hereinabove set forth or shown in the accompanying drawings are to be interpreted as illustrative and not in a limiting sense.

I claim:

1. A valve comprising a valve body having a valve chamber, upstream and downstream flow passages formed in said valve body and being in fluid communication with said valve chamber, a valve member disposed within the valve chamber and being movable between open and closed positions to control the flow of fluid through the valve, seat recesses formed in the valve body on opposite sides of the valve member, a pair of seat assemblies movably disposed one within each of said seat recesses, each of said seat assemblies establishing a face perimeter of sealing contact with said valve member, each of said seat assemblies having an outer back sealing member defining an outer perimeter of sealing contact between said seat assembly and said valve body which is disposed radially outwardly of said face perimeter of sealing contact, each of said seat assemblies having an inner back sealing member defining an inner perimeter of sealing contact between the seat assemblies and said valve body which is disposed radially inwardly of said face perimeter of sealing contact, means preventing sealing of the outer back sealing member of the downstream one of said assemblies and the inner back sealing member of the upstream one of said sealing members, whereby fluid pressure will produce a greater force upon the rear portion of both of said seat assemblies than at the face thereof thereby biasing each of said seat assemblies toward said valve member.

2. A valve as set forth in claim 1, said seat assemblies interfitting within said seat recesses to define a pair of annular chambers, one of said chambers extending radially inwardly of said face perimeter of sealing contact and the other disposed radially outwardly of said face perimeter of sealing contact, said inner back sealing member being disposed within said one of said annular chambers and said outer back sealing member being disposed within the other of said annular chambers.

3. A valve as set forth in claim 2, said back face sealing members being composed of resilient material and being greater in initial diameter than the radial dimension of the respective recess, said recesses being greater in axial length than the diameter of said back face sealing members, whereby said sealing members are capable of being moved axially by fluid pressure.

4. A valve as set forth in claim 2, means defining at least one passage between said annular chambers for bleeding fluid pressure past the inner back sealing member of said upstream seat and for bleeding fluid pressure past the outer back sealing member of the downstream seat.

5. A valve as set forth in claim 2, said back face sealing members comprising generally C-shaped cup members having the open sides thereof facing in axially opposed directions.

6. A valve comprising a valve body having a valve chamber formed therein, flow passages formed in said valve body and being disposed in fluid communication with said valve chamber, a valve member being disposed within said valve chamber and being movable between open and closed positions to control the flow of fluid through said valve, seat recesses formed in the valve body on opposite sides of said valve member, a seat assembly movably disposed in each of said seat recesses and establishing a perimeter of sealing contact with said valve member, means defining at least two seals between each of said seat assemblies and the associated seat recess, one of said seals extending radially outwardly of said perimeter of face sealing contact and the other of said seals extending radially inwardly of said perimeter of face sealing contact, means causing only one of said seals to function responsive to fluid pressure from the flow passage and causing only the other of said seals to function under fluid pressure from said valve chamber, whereby a greater area at the rear portion of said seat assembly is acted upon by fluid pressure than at the front portion thereof regardless of the direction of fluid flow through the valve, thereby resulting in a force differential which biases said seat assembly toward said valve member.

7. A valve as set forth in claim 6, each of said seat assemblies cooperating with said seat recesses to define a pair of concentrically related axially spaced annular back seal chambers having different diameters, the radially outer back seal chamber extending radially outwardly of said perimeter of sealing contact and the radially inner back seal chamber extending radially inwardly of said perimeter of sealing contact, a sealing member disposed in each of said back seal chambers and establishing a seal between said seat assembly and the walls of said seat pockets.

8. A valve as set forth in claim 7, said means causing only one of said seals to function responsive to fluid pressure comprising at least one fluid bypass passage formed in said seat assembly and establishing fluid communication between said back seal chambers, said sealing members being movable responsive to fluid pressure from said flow passage to a position bypassing the radially inner seal, and being responsive to fluid pressure from said valve chamber to move to a position causing fluid pressure to bypass said radially outer seal.

9. A valve as set forth in claim 7, said back sealing members having a generally C-shaped cross section formed by a generally radially disposed portion having upper and lower flanges integral therewith, said flanges being collapsible by fluid pressure from one direction to allow the leakage of fluid and expandable by fluid pressure from the opposite direction to maintain a fluid-tight seal, said sealing members being disposed in opposed relation with the open sides thereof facing one another.

10. A valve comprising a valve body having a valve chamber formed therein, flow passages formed in said valve body and being disposed in fluid communication with said valve chamber, a valve member being disposed within said valve chamber and being movable between open and closed positions to control the flow of fluid through said valve, seat recesses formed in the valve body on opposite sides of said valve member, a seat assembly movably disposed in each of said seat recesses and establishing a perimeter of sealing contact with said valve member, each of said seat recesses being formed in part by a pair of concentrically related generally cylindrical surfaces of different diameters, one of said cylindrical surfaces being disposed radially outwardly of said perimeter of sealing contact, said seat assembly having a pair of concentrically related generally cylindrical surfaces formed thereon at least one of which surfaces is disposed radially inwardly of said perimeter of sealing contact, said generally cylindrical surfaces cooperating to define a pair of concentrically related annular back seal chambers one of which extends radially outwardly of said perimeter of sealing contact and the other of which extends radially inwardly of said perimeter of sealing contact, a resilient sealing member disposed in each of said back seal chambers and establishing a seal between said seat assembly and the cylindrical surfaces of seat recess, each of said back sealing members allowing the bypass of fluid pressure in one direction and retaining the pressure in the opposite direction and being disposed to allow the bypass of fluid past the radially inner sealing member of the upstream seat and past the radially outer sealing member of the downstream seat, whereby a greater area at the rear portion of each seat assembly will be acted upon by fluid pressure than the area at the face thereof, thereby resulting in a force differential which biases each of the seat assemblies toward the valve member.

References Cited

UNITED STATES PATENTS 3,047,265 7/1962 Kaiser _____ 251—172
3,379,410 4/1968 Stewart _____ 251—174 XR HAROLD W. WEAKLEY, *Primary Examiner.*

U.S. Cl. X.R.

251—174, 316, 328, 363